(12) United States Patent
Varghese et al.

(10) Patent No.: US 9,106,422 B2
(45) Date of Patent: *Aug. 11, 2015

(54) SYSTEM AND METHOD FOR PERSONALIZED SECURITY SIGNATURE

(75) Inventors: Thomas Emmanual Varghese, San Mateo, CA (US); Sirena Wong, Emeryville, CA (US); Don Bosco Durai, Fremont, CA (US); Jon Bryan Fisher, Tiburon, CA (US); Arun Kothanath, Snoqualmie, WA (US)

(73) Assignee: Oracle International Corporation, Redwood Shores, CA (US)

( * ) Notice: Subject to any disclaimer, the term of this patent is extended or adjusted under 35 U.S.C. 154(b) by 1165 days.

This patent is subject to a terminal disclaimer.

(21) Appl. No.: 12/001,586

(22) Filed: Dec. 11, 2007

(65) Prior Publication Data

US 2008/0209526 A1 Aug. 28, 2008

Related U.S. Application Data

(60) Provisional application No. 60/869,385, filed on Dec. 11, 2006.

(51) Int. Cl.
*G06F 7/04* (2006.01)
*H04L 9/32* (2006.01)

(52) U.S. Cl.
CPC .................................. *H04L 9/32* (2013.01)

(58) Field of Classification Search
CPC ....................................................... H04L 9/32
USPC ................................................................ 726/5
See application file for complete search history.

(56) References Cited

U.S. PATENT DOCUMENTS

D95,205 S 4/1935 Harrison
D298,837 S 12/1988 Thomas
(Continued)

FOREIGN PATENT DOCUMENTS

EP 1615181 A1 11/2006
GB 2313460 A 11/1997
(Continued)

OTHER PUBLICATIONS

Birget et al., "The Graphical Passwords Project," printed from website http://clam.rutgers.edu/~birget/grPssw/, on Nov. 26, 2007 (2 pages).
(Continued)

*Primary Examiner* — Mohammad W Reza
(74) *Attorney, Agent, or Firm* — Kilpatrick Townsend & Stockton LLP (57) ABSTRACT

Embodiments of the present invention provide techniques for authenticating users based on personalized (i.e., user-provided or user-selected) authentication data. In one set of embodiments, the personalized authentication data includes acoustic, image, and/or video data, but is exclusive of biometric data of the user. In this manner, existing acoustic, image, and video-based authentication interfaces/mechanisms may be leveraged, without the problems associated with verifying biometric data. In some embodiments, a user may enroll or register multiple pieces of personalized authentication data into an authentication system. The user may then select one piece of personalized authentication data for use by the system at a time of authentication.

19 Claims, 8 Drawing Sheets

(56) References Cited

U.S. PATENT DOCUMENTS

| | | |
|---|---|---|
| 5,416,895 A | 5/1995 | Anderson et al. |
| 5,428,349 A | 6/1995 | Baker |
| 5,452,413 A | 9/1995 | Blades |
| 5,555,365 A | 9/1996 | Selby et al. |
| 5,559,961 A | 9/1996 | Blonder |
| 5,572,644 A | 11/1996 | Liaw et al. |
| 5,577,125 A | 11/1996 | Salahshour et al. |
| 5,604,854 A | 2/1997 | Glassey |
| 5,623,591 A | 4/1997 | Cseri |
| 5,664,099 A | 9/1997 | Ozzie et al. |
| 5,798,760 A | 8/1998 | Vayda et al. |
| D400,195 S | 10/1998 | Utesch |
| 5,821,933 A | 10/1998 | Keller et al. |
| 5,875,296 A | 2/1999 | Shi et al. |
| 5,928,364 A | 7/1999 | Yamamoto |
| 5,949,348 A | 9/1999 | Kapp et al. |
| 5,966,127 A | 10/1999 | Yajima |
| D419,907 S | 2/2000 | Vogelbruch |
| 6,023,506 A | 2/2000 | Ote et al. |
| 6,064,972 A | 5/2000 | Jankowitz et al. |
| 6,111,984 A | 8/2000 | Fukasawa |
| 6,209,102 B1 | 3/2001 | Hoover |
| 6,209,104 B1 | 3/2001 | Jalili |
| 6,240,183 B1 | 5/2001 | Marchant |
| 6,253,326 B1 | 6/2001 | Lincke et al. |
| 6,263,447 B1 | 7/2001 | French et al. |
| 6,282,551 B1 | 8/2001 | Anderson et al. |
| 6,343,361 B1 | 1/2002 | Nendell et al. |
| 6,369,839 B1 | 4/2002 | Peterson |
| 6,448,987 B1 | 9/2002 | Easty et al. |
| 6,658,574 B1 | 12/2003 | Anvekar |
| 6,718,471 B1 | 4/2004 | Kashima |
| 6,720,860 B1* | 4/2004 | Narayanaswami ......... 340/5.54 |
| 6,725,422 B1 | 4/2004 | Bauchot et al. |
| 6,741,268 B1 | 5/2004 | Hayakawa |
| D492,691 S | 7/2004 | Kortis |
| D493,471 S | 7/2004 | McIntosh |
| 6,853,973 B2 | 2/2005 | Mathews et al. |
| D505,135 S | 5/2005 | Sapp et al. |
| 6,895,502 B1 | 5/2005 | Fraser |
| 6,895,558 B1* | 5/2005 | Loveland ..................... 715/746 |
| 6,934,860 B1 | 8/2005 | Goldstein |
| 6,972,363 B2 | 12/2005 | Georges et al. |
| 7,007,298 B1* | 2/2006 | Shinzaki et al. .................. 726/3 |
| 7,036,091 B1 | 4/2006 | Nguyen |
| 7,054,819 B1* | 5/2006 | Loveland ..................... 704/273 |
| 7,082,227 B1 | 7/2006 | Baum et al. |
| 7,100,049 B2 | 8/2006 | Gasparini et al. |
| 7,137,008 B1 | 11/2006 | Hamid et al. |
| D539,809 S | 4/2007 | Totten et al. |
| 7,200,747 B2 | 4/2007 | Riedel et al. |
| 7,219,368 B2 | 5/2007 | Juels et al. |
| 7,237,264 B1 | 6/2007 | Graham et al. |
| 7,240,367 B2 | 7/2007 | Park |
| 7,437,024 B2 | 10/2008 | Baum et al. |
| 7,523,067 B1 | 4/2009 | Nakajima |
| 7,586,635 B2* | 9/2009 | Maeda et al. ................. 358/1.15 |
| 7,596,701 B2 | 9/2009 | Varghese et al. |
| 7,616,764 B2 | 11/2009 | Varghese et al. |
| 7,822,990 B2 | 10/2010 | Varghese et al. |
| 2001/0027529 A1 | 10/2001 | Sasabe et al. |
| 2002/0013905 A1 | 1/2002 | Hamada |
| 2002/0029341 A1 | 3/2002 | Juels et al. |
| 2002/0049614 A1 | 4/2002 | Rice et al. |
| 2002/0087894 A1 | 7/2002 | Foley et al. |
| 2002/0122031 A1 | 9/2002 | Maglio et al. |
| 2002/0188872 A1 | 12/2002 | Willeby |
| 2003/0005329 A1 | 1/2003 | Ikonen |
| 2003/0018558 A1 | 1/2003 | Heffner et al. |
| 2003/0097593 A1 | 5/2003 | Sawa et al. |
| 2003/0159050 A1 | 8/2003 | Gantman et al. |
| 2003/0182558 A1 | 9/2003 | Lazzaro et al. |
| 2003/0210127 A1 | 11/2003 | Anderson |
| 2004/0010721 A1 | 1/2004 | Kirovski et al. |
| 2004/0030933 A1 | 2/2004 | Park |
| 2004/0030934 A1 | 2/2004 | Mizoguchi et al. |
| 2004/0034801 A1 | 2/2004 | Jaeger |
| 2004/0059951 A1 | 3/2004 | Pinkas et al. |
| 2004/0073809 A1 | 4/2004 | Wing Keong |
| 2004/0083389 A1 | 4/2004 | Yoshida |
| 2004/0117320 A1 | 6/2004 | Morioka et al. |
| 2004/0128534 A1 | 7/2004 | Walker |
| 2004/0139353 A1 | 7/2004 | Forcade |
| 2004/0153650 A1 | 8/2004 | Hillmer et al. |
| 2004/0153660 A1 | 8/2004 | Gaither et al. |
| 2004/0168083 A1 | 8/2004 | Gasparini et al. |
| 2004/0215980 A1 | 10/2004 | Hamid |
| 2004/0221163 A1 | 11/2004 | Jorgensen |
| 2004/0230843 A1 | 11/2004 | Jansen |
| 2004/0250138 A1 | 12/2004 | Schneider |
| 2005/0010768 A1 | 1/2005 | Light et al. |
| 2005/0015601 A1 | 1/2005 | Tabi |
| 2005/0044425 A1 | 2/2005 | Hypponen |
| 2005/0097320 A1 | 5/2005 | Golan et al. |
| 2005/0097339 A1 | 5/2005 | Wiley et al. |
| 2005/0144451 A1 | 6/2005 | Voice et al. |
| 2005/0154676 A1 | 7/2005 | Ronning et al. |
| 2005/0193208 A1 | 9/2005 | Charrette, III et al. |
| 2005/0204131 A1 | 9/2005 | Kovarik, Jr. |
| 2005/0204145 A1 | 9/2005 | Makishima |
| 2005/0251752 A1 | 11/2005 | Tan et al. |
| 2005/0278542 A1 | 12/2005 | Pierson et al. |
| 2005/0278647 A1 | 12/2005 | Leavitt et al. |
| 2006/0011045 A1 | 1/2006 | Yamashita et al. |
| 2006/0212829 A1 | 9/2006 | Yahiro et al. |
| 2006/0282660 A1 | 12/2006 | Varghese et al. |
| 2006/0288225 A1* | 12/2006 | Jung et al. ..................... 713/182 |
| 2007/0028111 A1* | 2/2007 | Covely .......................... 713/176 |
| 2007/0036214 A1 | 2/2007 | Kloberdans et al. |
| 2007/0097351 A1 | 5/2007 | York et al. |
| 2007/0165849 A1 | 7/2007 | Varghese et al. |
| 2007/0169190 A1 | 7/2007 | Kolton et al. |
| 2007/0211925 A1* | 9/2007 | Aoki et al. .................... 382/118 |
| 2009/0089869 A1 | 4/2009 | Varghese et al. |

FOREIGN PATENT DOCUMENTS

| | | |
|---|---|---|
| JP | 2002-222172 A | 8/2002 |
| JP | 2004-258845 A | 9/2004 |
| WO | WO 96/18139 A1 | 6/1996 |
| WO | WO01/18636 A1 | 3/2001 |
| WO | WO0165375 A1 | 9/2001 |
| WO | WO 2004/053674 A2 | 6/2004 |
| WO | WO2005025292 A2 | 3/2005 |
| WO | WO 2006/010058 A2 | 1/2006 |
| WO | WO 2006/118968 A2 | 11/2006 |
| WO | WO 2007/087352 A2 | 8/2007 |

OTHER PUBLICATIONS

"Echo System," Identita: The Powered Card™ Identity Provider, printed from website http://222.identita.com/sol_eco_sys.html, on Nov. 26, 2007 (2 pages).

Identita Technologies Inc., "Audio Authentication Devices," (2 pages).

Frost & Sullivan, "Leading European Financial Institution Implements Voice Verification Biometrics to Enrich Customer Experience," Jul. 2006 (13 pages).

"VoiceVault," VoiceVault™ World Leaders in Voice Verification, printed from website http://www.voicevault.com/ca.aspx on Nov. 13, 2007 (2 pages).

"VoiceVault," VoiceVault™ World Leaders in Voice Verification, "What is 'two factor authentication'?," printed from website http://www.voicevault.com/twofactor.aspx on Nov. 13, 2007 (2 pages).

"VoiceVault," VoiceVault™ World Leaders in Voice Verification, "How VoiceVault Works," printed from website http://www.voicevault.com/works.aspx on Nov. 13, 2007 (1 page).

U.S. Appl. No. 12/882,096, filed Sep. 14, 2010, Varghese et al.

Notice of Allowance for U.S. Appl. No. 11/169,564 mailed on Jun. 1, 2009; 9 pages.

Non-Final Office Action for U.S. Appl. No. 11/169,564 mailed on Nov. 13, 2008; 22 pages.

(56) References Cited

OTHER PUBLICATIONS

Supplemental Non-Final Office Action for U.S. Appl. No. 11/318,414 mailed on Jan. 27, 2009; 10 pages.
Non-Final Office Action for U.S. Appl. No. 11/318,414 mailed on Nov. 13, 2008; 19 pages.
Notice of Allowance for U.S. Appl. No. 11/318,424 mailed on Jun. 16, 2010; 7 pages.
Advisory Action for U.S. Appl. No. 11/318,424 mailed on May 25, 2010; 3 pages.
Final Office Action for U.S. Appl. No. 11/318,424 mailed on Mar. 10, 2010; 11 pages.
Non-Final Office Action for U.S. Appl. No. 11/318,424 mailed on Sep. 1, 2009; 14 pages.
Advisory Action for U.S. Appl. No. 11/318,424 mailed on Jul. 30, 2009; 3 pages.
Final Office Action for U.S. Appl. No. 11/318,424 mailed on Jun. 2, 2009; 16 pages.
Non-Final Office Action for U.S. Appl. No. 11/318,424 mailed on Dec. 1, 2008; 12 pages.
Notice of Allowance for U.S. Appl. No. 11/340,376 mailed on Jun. 12, 2009; 11 pages.
Non-Final Office Action for U.S. Appl. No. 11/340,376 mailed on Jan. 15, 2009; 11 pages.
Non-Final Office Action for U.S. Appl. No. 11/340,376 mailed on Aug. 4, 2008; 5 pages.
Advisory Action for U.S. Appl. No. 11/340,376 mailed on May 27, 2008; 3 pages.
Final Office Action for U.S. Appl. No. 11/340,376 mailed on Mar. 19, 2008; 10 pages.
Non-Final Office Action for U.S. Appl. No. 11/340,376 mailed on Jul. 27, 2007; 10 pages.
Notice of Allowance for U.S. Appl. No. 11/412,997 mailed on Dec. 14, 2010; 6 pages.
Non-Final Office Action for U.S. Appl. No. 11/412,997 mailed on Sep. 13, 2010; 18 pages.
Final Office Action for U.S. Appl. No. 11/412,997 mailed on May 11, 2010; 24 pages.
Non-Final Office Action for U.S. Appl. No. 11/412,997 mailed on Nov. 16, 2009; 19 pages.
Non-Final Office Action for U.S. Appl. No. 11/412,997 mailed on Apr. 10, 2009; 37 pages.
Non-Final Office Action for U.S. Appl. No. 11/412,997 mailed on Sep. 30, 2008; 27 pages.
International Search Report for PCT Application No. PCT/US2005/024376 mailed on Apr. 7, 2006; 4 pages.
International Preliminary Report on Patentability for PCT Application No. PCT/US2005/024376 mailed on Apr. 13, 2007; 4 pages.
Written Opinion for PCT Application No. PCT/US2005/024376 mailed on Apr. 7, 2006; 4 pages.
International Search Report for PCT Application No. PCT/US06/16085 mailed on Jul. 7, 2008; 2 pages.
Written Opinion for PCT Application No. PCT/US06/16085 mailed on Jul. 7, 2008; 9 pages.
International Preliminary Report on Patentability in International Application No. PCT/US2006/016085 mailed on Aug. 28, 2008; 10 pages.
International Search Report for PCT Application No. in PCT Application No. PCT/US07/01899 mailed on Feb. 14, 2008; 2 pages.
Written Opinion for PCT Application No. PCT/US07/01899 mailed on Feb. 14, 2008; 4 pages.
"How to Set a Wallpaper on the Background of a Folder Window", Microsoft Corporation, Document No. 879735, http://support.microsoft.com/kb/879735/ja (Dec. 27, 2004).
Non-Final Office Action for U.S. Appl. No. 12/260,544 (May 22, 2013). 14 pages.
Government of India Patent Office Examination Report for application IN4248/KOLNP/2007 mailed Jan. 30, 2014.
Final Office Action for U.S. Appl. No. 12/260,544 (Oct. 31, 2013) 15 pages.
Final Office Action for U.S. Appl. No. 12/260,544 (Nov. 15, 2012).
European Patent Office (EPO) Communication for European application EP11169063.2 (Nov. 2, 2012).
European Examination Report for patent application EP5773133.3 (Apr. 10, 2012).
European Examination Report for patent application EP7762565.5 (Jul. 6, 2012).
Final Office Action for U.S. Appl. No. 12/882,096, mailed on Oct. 18, 2012.
European Search Report for application EP06758687.5 (Mar. 14, 2012).
European Search Report for application EP11169063.2 (Mar. 21, 2012).
"ssh—OpenSSH SSH client (remote login program)" BSD General Commands Manual, from internet: http://unixhelp.ed.ac.uk/CGI/man-cgi?ssh+1 (Sep. 1999).
Final Office Action for U.S. Appl. No. 12/882,096, mailed on Jun. 21, 2012.
Non-Final Office Action for U.S. Appl. No. 12/260,544, mailed on Jun. 7, 2012.
Office Action from China Intellectual Property Office for application CN200780003321.5 (Jun. 18, 2012).
Notice of Allowance for U.S. Appl. No. 12/260,544 (Mar. 3, 2014) 5 pages.

* cited by examiner

SYSTEM AND METHOD FOR PERSONALIZED SECURITY SIGNATURE

CROSS-REFERENCES TO RELATED APPLICATIONS

This application claims the benefit of U.S. Provisional Application No. 60/869,385, filed Nov. 11, 2006 by Varghese et al. and entitled "System and Method for Personalized Security Signature," the disclosure of which is incorporated herein by reference in its entirety for all purposes.

BACKGROUND OF THE INVENTION

Embodiments of the present invention relate to authentication, and more particularly relate to techniques for authenticating a user based on personalized (i.e., user-provided) authentication data.

User authentication is the process of verifying the identity of a principal (i.e., a user) for a security-related purpose. Generally speaking, this verification is performed by testing one or more of the following "authentication factors:" (1) something the principal knows (referred to as a Type I authentication factor), (2) something the principal has (referred to as a Type II authentication factor), and (3) something the principal is (referred to as a Type III authentication factor).

In the field of computer security, a significant number of existing authentication systems rely on textual passwords or personal identification numbers (i.e., Type I authentication factors) in order to verify the identities of users. However, authentication based on textual authentication data is well-known to have several weaknesses. For example, relatively secure (i.e., complex) passwords are generally difficult to remember. Conversely, short or easily memorized passwords are relatively insecure and may be attacked through a variety of methods, such as a dictionary attack. In some cases, Type I authentication factors are combined with Type II authentication factors to increase the security of a system. For example, an ATM machine typically requires both a PIN and a physical ATM card to carry out transactions. However, Type II authentication factors may also be compromised, such as through loss or theft.

To address some of the above weaknesses, a growing number of computer-based authentication systems are incorporating authentication via Type III, or biometric, authentication factors. Exemplary biometric characteristics include fingerprints, voice, face geometry, retinal pattern, and the like. Since biometric characteristics are inherent to a particular individual, there is no need to memorize authentication information such as a textual password. In addition, many believe that a biometric characteristic cannot be stolen as easily as a physical (i.e., Type II) authentication device/token. To support these biometric systems, non-textual authentication interfaces have been developed. For example, acoustic-based interfaces have been developed to support authentication via voice recognition. Similarly, image and video-based interfaces have been developed to support authentication via facial recognition, fingerprint recognition, and the like.

Unfortunately, despite their advantages, biometric authentication systems still possess a number of weaknesses. Voice-based authentication, in particular, is problematic for several reasons. First, the enrollment/registration process necessary to register a user's voice into a voice-based authentication system can be both time-consuming and cumbersome. For example, this process typically requires the user to recite several sentences or paragraphs-worth of training data into the system to generate a voice model for the user. In addition, the training data must generally be recited in a quiet environment to capture the user's voice with adequate clarity and precision. As a result, users may be unwilling to spend the time and effort demanded by this process.

Second, authentication based on voice recognition is not particularly reliable. For example, it is possible for an attacker to impersonate the voice of a legitimate user and thus fool the system into providing access. This is known as a "false positive." It is also possible for a user's voice to change temporarily (e.g., due to a cold or other illness), and thus cause the user to be denied access even though the user is legitimate. This is known as a "false negative." In either situation, the authentication mechanism fails to operate as intended.

Third, voice recognition is generally a very complex process and may require significant resources to be performed with a reasonable degree of accuracy. For example, a large amount of storage resources may be necessary to store registered training data and voice models, and a large amount of computational resources may be necessary to verify a given voice sample against a registered model. Accordingly, the costs associated with deploying and maintaining a voice-based authentication system can be prohibitively high.

Fourth, since voice characteristics (and other types of biometric characteristics) are inherent to a user, they cannot be reset or reissued if the user's voice is somehow compromised (e.g., through impersonation or a voice recording). This is a significant concern because the legitimate user will have no way to regain secure access to the system. In addition, the legitimate user will no longer be able to user his or her voice as an authentication credential for other voice-based systems.

BRIEF SUMMARY OF THE INVENTION

Embodiments of the present invention address the foregoing and other such problems by providing techniques for authenticating users based on personalized (i.e., user-provided) authentication data. In one set of embodiments, the personalized authentication data includes acoustic, image, and/or video data, but is exclusive of biometric data of the user. In this manner, existing acoustic, image, and video-based authentication interfaces/mechanisms may be leveraged, without the problems associated with verifying biometric data. In some embodiments, a user may enroll or register multiple pieces of personalized authentication data into an authentication system. The user may then select one piece of personalized authentication data for use by the system at a time of authentication.

According to one embodiment of the present invention, a method for facilitating user authentication comprises associating first non-textual authentication data with a user, where the first non-textual authentication data is provided or selected by the user, and where the first non-textual authentication data does not include biometric data of the user. The user is then authenticated based on the first non-textual authentication data. In some embodiments, the first non-textual authentication data includes acoustic data, such as a user-provided tone sequence or a user provided audio clip. In other embodiments, the first non-textual authentication data includes graphical data, such as a user-provided still image or a user-provided video clip. As described in further detail below, the authentication may be performed using existing acoustic-based or image/video-based authentication interfaces/mechanisms.

In one set of embodiments, the method above further comprises storing the first non-textual authentication data on a device usable by the user, such as a cellular phone, personal computer, personal digital assistant (PDA), smart card, security token, and the like. The first non-textual authentication data is then retrieved from the device at a time of authentication. In these embodiments, authenticating the user may be further based on one or more attributes of the device.

In another set of embodiments, the method above further comprises associating second non-textual authentication data with the user, where the second non-textual authentication data is different from the first non-textual authentication data, and where the second non-textual authentication data is provided by the user. In various embodiments, either the first non-textual authentication data or the second non-textual authentication data may be selected for use in authenticating the user.

In one set of embodiments, associating the first non-textual authentication data with the user comprises receiving the first non-textual authentication data from the user, and registering the first non-textual authentication data with an identity of the user in a registration database. For example, the first non-textual authentication data may be received via a computer (e.g., intranet, Internet) or voice-based (e.g., telephony, cellular) network.

In another set of embodiments, authenticating the user based on the first non-textual authentication data comprises receiving input non-textual authentication data from the user, and determining whether the input non-textual authentication data matches the first non-textual authentication data.

In another set of embodiments, authenticating the user based on the first non-textual authentication data comprises receiving a one-time password from the user, where the one-time password is derived from the first non-textual authentication data. The user is then authenticated based on the one-time password.

According to another embodiment of the present invention, an authentication system is provided. The system comprises a registration unit for registering non-textual authentication data with an identity of a user in a registration database, where the non-textual authentication data is provided by the user, and where the non-textual authentication data does not correspond to biometric data of the user. The system further comprises an authentication unit for authenticating the user based on the non-textual authentication data.

According to yet another embodiment of the present invention, a machine-readable medium is disclosed, the machine-readable medium having stored thereon a series of instructions which, when executed by a processing component, cause the processing component to facilitate user authentication. In various embodiments, the series of instructions cause the processing component to associate non-textual authentication data with a user, where the non-textual authentication data is provided by the user, and where the non-textual authentication data does not correspond to biometric data of the user. The series of instructions further cause the processing component to authenticate the user based on the non-textual authentication data.

A further understanding of the nature and advantages of the embodiments disclosed herein may be realized by reference to the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

In the following description, for the purposes of explanation, numerous specific details are set forth in order to provide an understanding of the present invention. It will be apparent, however, to one skilled in the art that the present invention may be practiced without some of these specific details.

Embodiments of the present invention provide techniques for authenticating users based on personalized authentication data. A general approach to user authentication includes two steps—(1) enrollment/registration of authentication data, and (2) verification of input authentication data against the registered authentication data. Embodiments of the present invention allow a user to provide the authentication data they wish to enroll into a system. The authentication data may be provided, for example, by being uploaded or played back from a storage device of the user. The authentication data may also be provided by being selected by the user from a data library of a third party; in this embodiment, the selection of a particular piece of authentication data is provided to the system for enrollment. This user-provided, or personalized, authentication data is then used to authenticate the user at a time of verification. In various embodiments, the personalized authentication data may include acoustic data, image data, video data, or any other type of non-textual data. However, the personalized authentication data will generally not include biometric data of the user. Thus, the problems associated with registering and verifying biometric data (such as voice data) may be minimized or avoided. As described herein, the step of verification/authentication may be performed using existing interfaces and algorithms for verifying acoustic data, image data, and/or video data.

Embodiments of the present invention may be used in a variety of different domains and contexts. For example, one embodiment may be used as part of a voice-based authentication system that enables users to register and verify personalized authentication data using a standard telephone or cellular phone. Another embodiment may be used as part of a network-based authentication system that enables users to register and verify personalized authentication data via a computer network such as the Internet. In the present disclosure, the term "personalized authentication data" is used interchangeably with the term "personalized security signature," and generically refers to any type of user-provided or user-selected data that facilitates user authentication.

Figure 1:
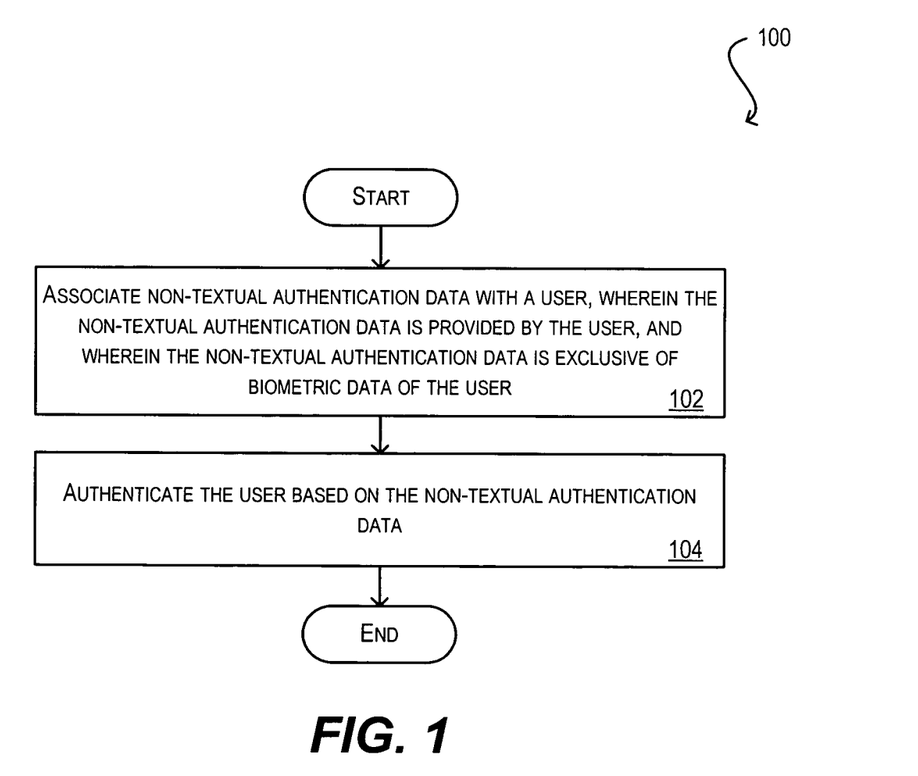
FIG. 1 is a flowchart illustrating the steps performed in facilitating user authentication in accordance with an embodiment of the present invention.

FIG. 1 is a flowchart 100 illustrating the steps performed in facilitating user authentication in accordance with an embodiment of the present invention. In various embodiments, the processing of flowchart 100 may be implemented in software, hardware, or combinations thereof. For example, as software, flowchart 100 may be implemented as part of a standalone authentication application, or as an authentication module within an application program or service. Further, the software may be stored on a machine-readable medium, and may include code or instructions that may be executed by a processor. One of ordinary skill in the art would recognize many variations, modifications, and alternatives.

At step 102, non-textual authentication data is associated with a user, where the non-textual authentication data is provided by the user (i.e., personalized by the user), and where the non-textual authentication data is exclusive of biometric data of the user. In a particular embodiment, this step corresponds to registering or enrolling the non-textual authentication data with an identity of the user. The non-textual authentication data may include acoustic data, such as a user-provided tone sequence or a user-provided audio clip. For example, the user may use the alphanumeric keys on a telephone to select a series of notes, or the user may provide a portion of his or her favorite song. Alternatively, the non-textual authentication data may include graphical data, such as a user-provided still image or a user-provided video clip.

In one set of embodiments, the non-textual authentication data described in step 102 may be stored on a device of the user such as a cellular phone, personal computer, smart card, security token, or the like. In this manner, the user may have convenient access to his or her personalized authentication data. If for example, the user needs to login into a system using the stored authentication data, the authentication data may be retrieved from the device at a time of verification/authentication. In addition, the device may be configured to provide a number of additional functions. For example, the device may be configured to generate randomized authentication data on behalf of the user. In another embodiment, attributes of the device may be used, in conjunction with the non-textual authentication data, to verify the identity of the user at a time of authentication. Examples of these devices are discussed in greater detail with respect to FIG. 7 below.

At step 104, the user is authenticated/verified based on the non-textual authentication data associated/registered with the user. In various embodiments, authentication/verification comprises comparing a piece of input authentication data provided by the user with the registered authentication data. Existing mechanisms/algorithms for verifying acoustic, image, and/or video-based data (such as pattern matching algorithms) may be leveraged to perform the authentication.

By utilizing personalized authentication data rather than biometric authentication data to facilitate user authentication, a number of advantages are achieved. For example, there is no need for the user to undergo a lengthy and cumbersome enrollment process to generate a biometric model. Instead, the user need only playback (in the case of registering over a telephone) or upload (in the case of registering over a computer network) his or her personalized authentication data to the authentication system, where it is simply captured and stored. Further, since embodiments of the present invention can make use of existing and well-known techniques for verifying non-textual data, the reliability and performance of authentication is improved. Yet further, the personalized authentication data may be easily reset with a different piece of data if it is compromised.

It should be appreciated that the specific steps illustrated in FIG. 1 provide a particular method for facilitating user authentication according to an embodiment of the present invention. Other sequences of steps may also be performed according to alternative embodiments. For example, the individual steps illustrated in FIG. 1 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 2:
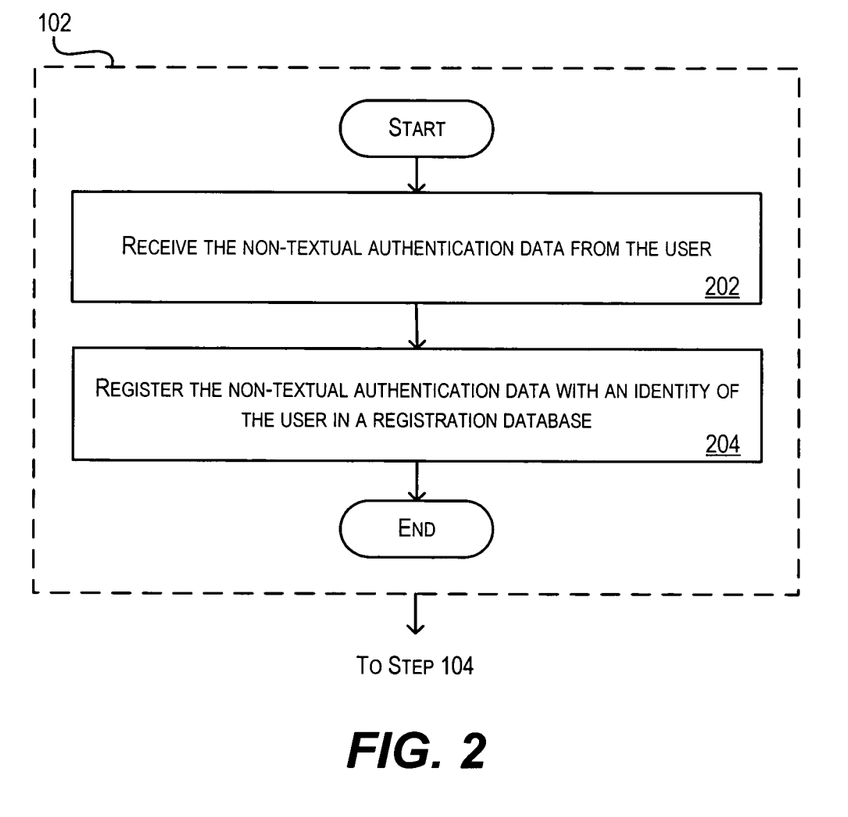
FIG. 2 is a flowchart illustrating the steps performed in associating authentication data with user in accordance with an embodiment of the present invention.

FIG. 2 is a flowchart illustrating a particular method for associating non-textual authentication data with a user as provided in step 102 of FIG. 1. At step 202, the non-textual authentication data is received from the user. As mentioned above, the non-textual authentication data may be received by being played back over a voice line, or by being uploaded over a computer network. In one embodiment, the non-textual authentication data is received directly from a storage device of the user.

In alternative embodiments, the non-textual authentication data may be received from a third party (such as a service provider or an authentication system) rather than the user. For example, a service provider may wish to pre-enroll users of its service by assigning an initial piece of authentication data to each user.

Once the non-textual authentication data is received, it is registered with an identity of the user in a registration database (step 204). The identity of the user may include, for example, a login or account name, as well as other identity information such as real name, address, and the like. In one set of embodiments, this identity information may already be stored in the registration database at the time of registering the non-textual authentication data. In other embodiments, the identity information and the non-textual authentication data may be provided concurrently for registration in the registration database.

Figure 3:
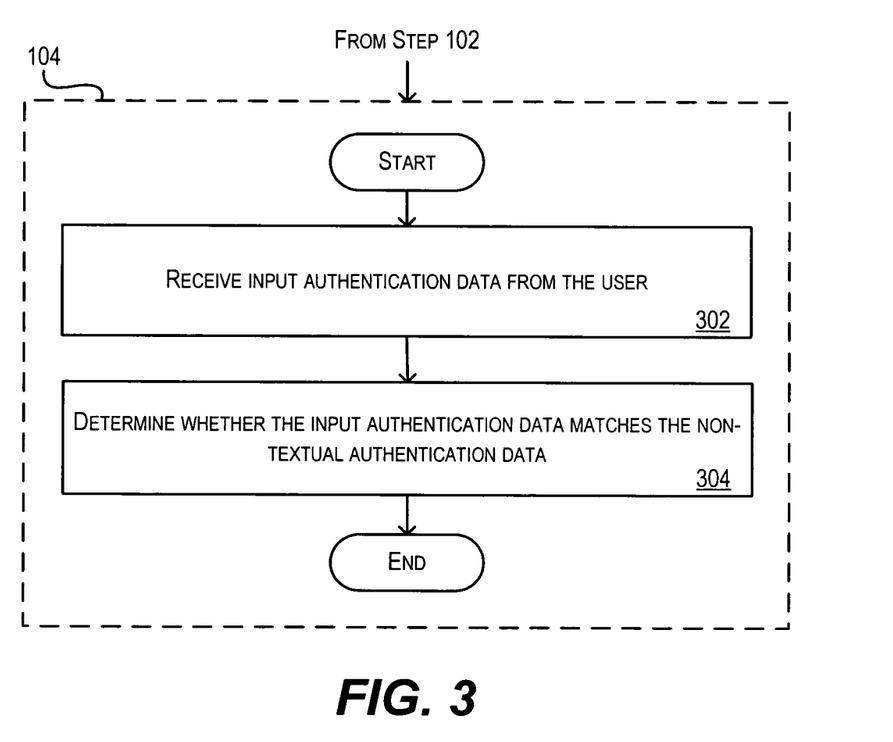
FIG. 3 is a flowchart illustrating the steps performed in authenticating a user in accordance with an embodiment of the present invention.

FIG. 3 is a flowchart illustrating a particular method for verifying/authenticating a user as provided in step 104 of FIG. 1. Note that this flowchart assumes that the user has already been associated (e.g., registered) with the non-textual authentication data described in step 102. At step 302, input authentication data is received from the user, where the input authentication data is received as part of a request to gain access to a secured resource/service. As discussed above, the user's authentication data may be stored on, and retrieved from, a device of the user, such as a cellular phone, personal computer, smart card, security token, or the like.

At step 304, a determination is made whether the input authentication data matches the non-textual authentication data associated with the user. If the input authentication data matches the non-textual authentication data, authentication succeeds and access is provided to the desired resource/service. If the input authentication data does not match the non-textual authentication data, authentication fails and access is denied. Generally speaking, this determination may be performed using any of a number of well-known algorithms for verifying non-textual data, such as techniques for acoustic, image, or video-based pattern matching. One of ordinary skill in the art would recognize many variations, modifications, and alternatives.

Figure 4:
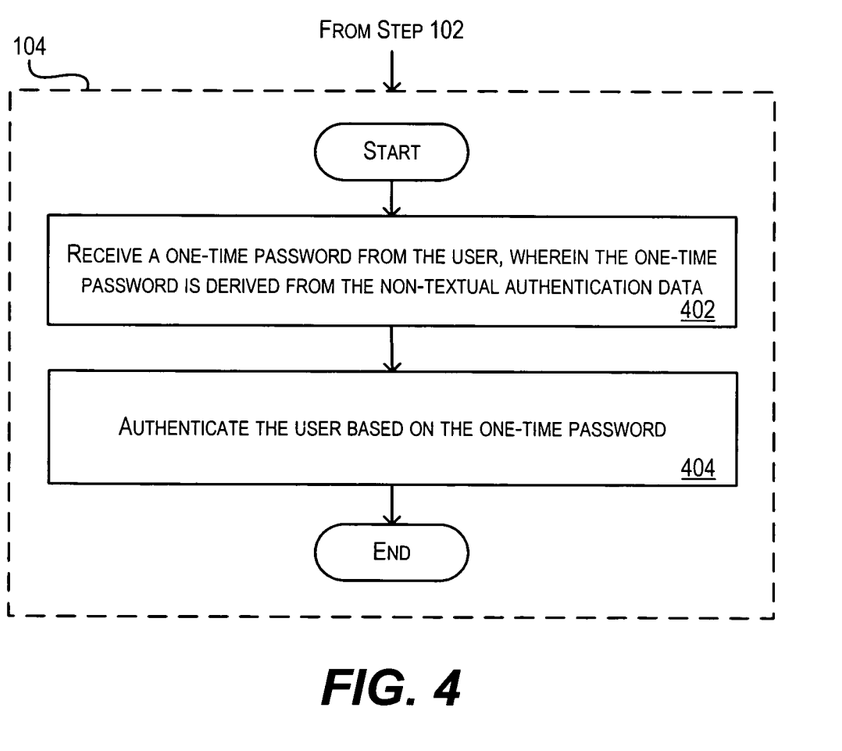
FIG. 4 is a flowchart illustrating alternative steps performed in authenticating a user in accordance with an embodiment of the present invention.

FIG. 4. is a flowchart illustrating another method for verifying/authenticating a user as provided in step 104 of FIG. 1. This particular method makes use of one-time password (OTP) technology to transform the personalized authentication data prior to transmission to an authentication system for verification. As is well known in the art, an OTP is a unique transformation of a specific piece of seed authentication data, and the OTP is uniquely generated for each authentication instance. This serves a number of purposes. First, since the OTP (rather than the seed authentication data) is transmitted to the authentication system for verification, it is significantly more difficult to compromise the seed data. Second, since each generated OTP is unique, two or more users may choose the same seed authentication data (e.g., the same audio clip or image), and still be distinguishable by the authentication system.

At step 402, a one-time password (OTP) is received from the user, where the one-time password is derived from the non-textual authentication data. In one set of embodiments, the OTP is generated by the device storing the non-textual authentication data. In other embodiments, the OTP is generated by another device. The OTP may correspond to a mathematical algorithm type OTP, a time-synchronized type OTP, a challenge type OTP, or the like. One of ordinary skill in the art would recognize many variations, modifications, and alternatives.

Once the OTP has been received, the user is authenticated based on the OTP (step 404). This may include, for example, extracting/decoding authentication data from the OTP, and then comparing the extracted authentication data to the non-textual authentication data associated with the user. It should be appreciated that the exact mechanism for authenticating the user will depend on the type of the OTP implemented.

Figure 5:
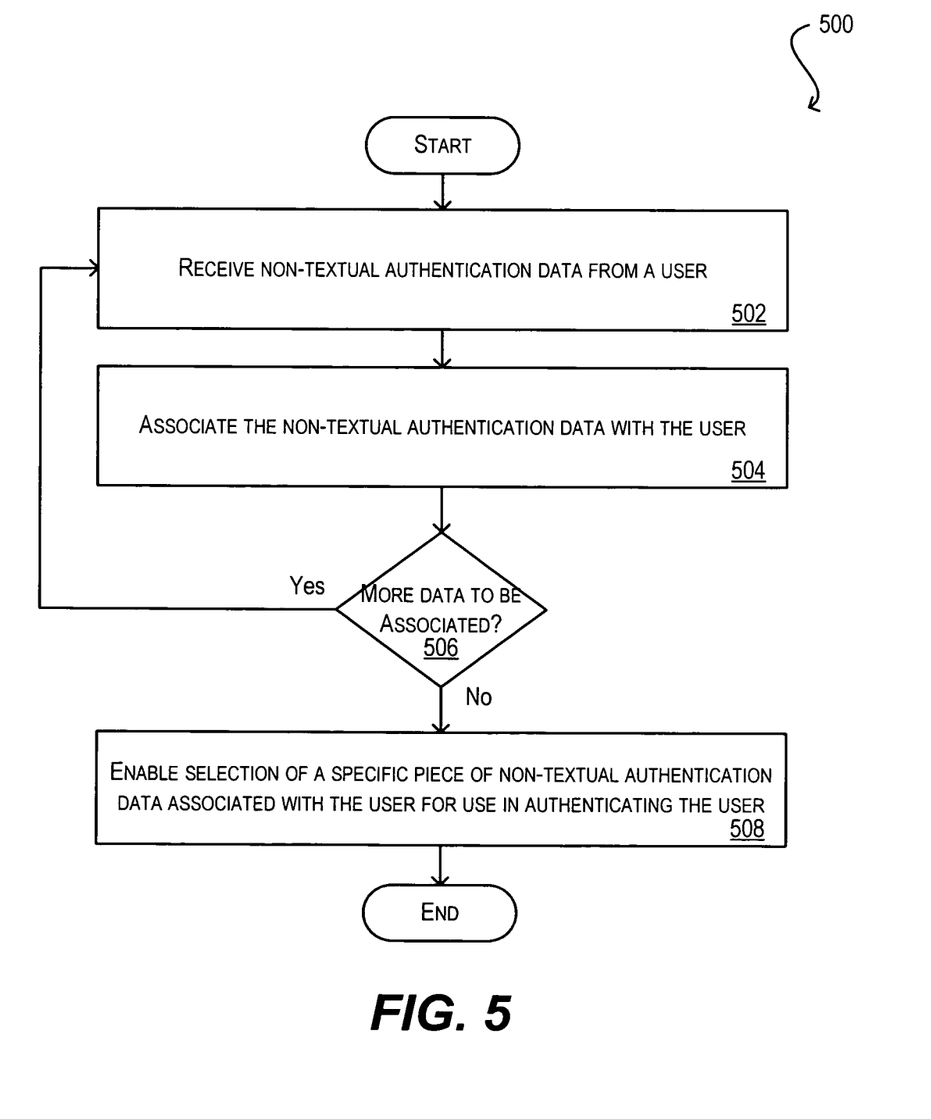
FIG. 5 is a flowchart illustrating the steps performed in associating multiple pieces of authentication data with a user in accordance with an embodiment of the present invention.

FIG. 5 is a flowchart 500 illustrating the steps performed in registering multiple pieces of personalized authentication data for a single user in accordance with an embodiment of the present invention. In various embodiments, the processing of flowchart 500 may be implemented in software, hardware, or combinations thereof. For example, as software, flowchart 500 may be implemented as part of a standalone authentication application, or as an authentication module within an application program or service. Further, the software may be stored on a machine-readable medium, and may include code or instructions that may be executed by a processor. One of ordinary skill in the art would recognize many variations, modifications, and alternatives.

At steps 502 and 504, non-textual authentication data is received from, and associated (i.e., registered), with a user. As described above, the non-textual authentication data may include acoustic data, image data, video data, and the like. At step 506, a determination is made whether the user has additional pieces of non-textual authentication data to be registered. If so, steps 502 and 5034 are repeated for each additional piece of non-textual authentication data. In various embodiments, each piece of non-textual authentication data associated with the user at step 504 may be used to verify/authenticate the user. In one set of embodiments, the various pieces of non-textual authentication data may include the same type of data. For example, they may all include acoustic data. In another set of embodiments, the various pieces of non-textual authentication data may include different types of data. For example, first and second pieces of non-textual authentication data may include acoustic data and image data respectively. In most cases, the various pieces of authentication data will not be identical.

At step 506, selection of a specific piece of non-textual authentication data associated with the user is enabled, such that the selected authentication data is used to authenticate the user. This selection may be performed by either the user or a third party, such as a service provider or the authentication system. In addition, this selection may be performed for any of a number of reasons. For example, the user or the authentication system may determine that the first authentication data has been compromised, and therefore switch to using the second authentication data for verification. In one set of embodiments, the selection of a specific piece of authentication data may be performed prior to a time of authentication, such as during the association step 102 of FIG. 1. In other embodiments, the selection may be performed at a time of authentication.

It should be appreciated that the specific steps illustrated in FIG. 5 provide a particular method for registering multiple pieces of authentication data for a user according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 6:
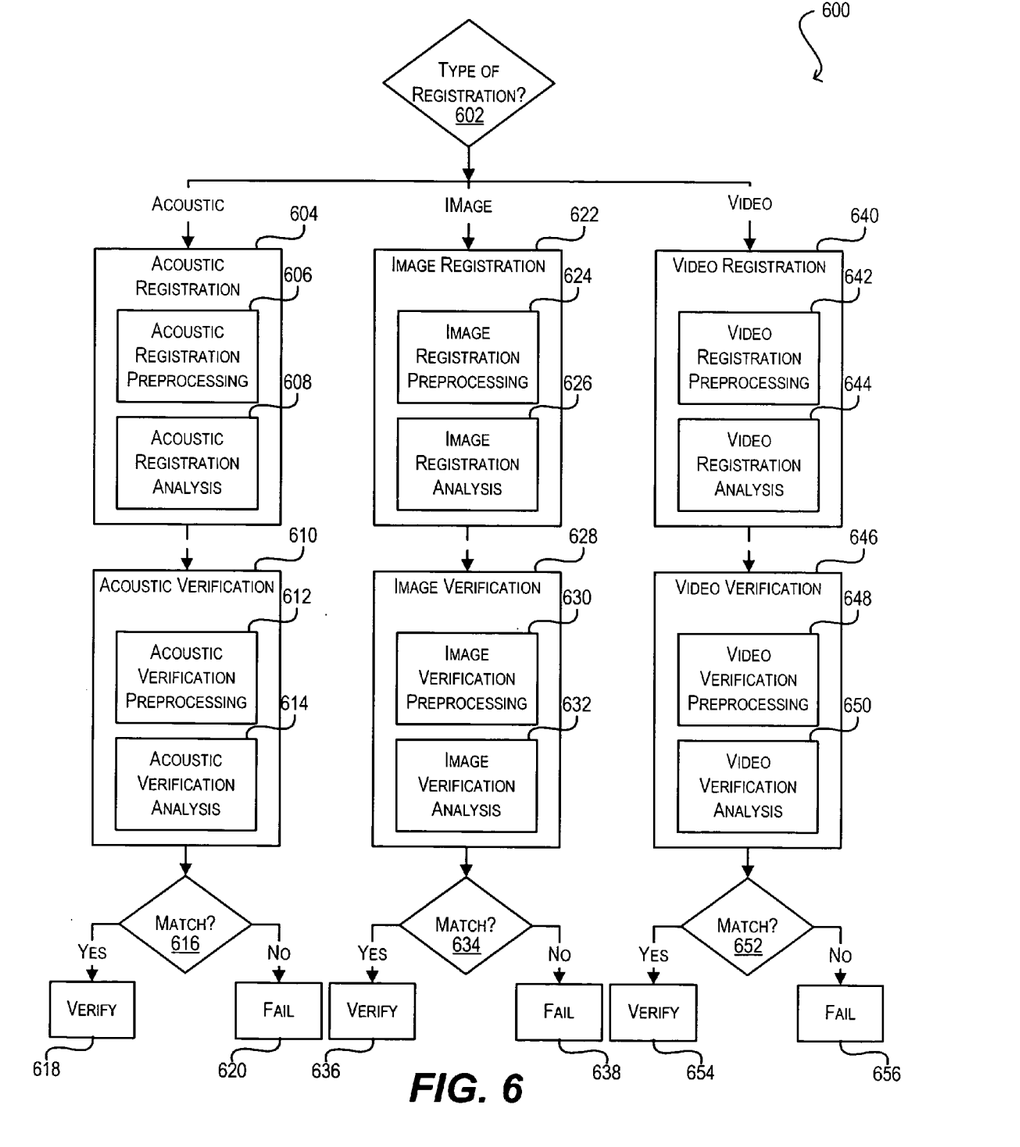
FIG. 6 is a flowchart illustrating the steps performed in registering and verifying authentication data for a user in accordance with an embodiment of the present invention.

FIG. 6 is a flowchart 600 illustrating the steps performed in registering and verifying personalized authentication data in accordance with an embodiment of the present invention. In various embodiments, the processing of flowchart 600 may be implemented in software, hardware, or combinations thereof. For example, as software, flowchart 600 may be implemented as part of a standalone authentication application, or as an authentication module within an application program or service. Further, the software may be stored on a machine-readable medium, and may include code or instructions that may be executed by a processor. As hardware, portions of flowchart 600 (e.g., data preprocessing and analysis steps 606, 608, 612, 614, 624, 626, 630, 632, 642, 644, 648, 650) may be implemented as a field-programmable gate array (FPGA) or application-specific integrated circuit (ASIC). One of ordinary skill in the art would recognize many variations, modifications, and alternatives.

At step 602, the type of registration is determined. In various embodiments, the type of registration will depend on the type of personalized authentication data that is provided by the user for registration. It should be appreciated that although only three types of authentication data are illustrated (acoustic, image, and video) any other type of non-textual authentication data may be supported.

Once a particular type of registration as been determined, control proceeds to an appropriate registration block (604, 622, 640). Each registration block includes a registration preprocessing block 606, 624, 642 configured to preprocess the user-provided authentication data. In the case of acoustic authentication data, registration preprocessing block 604 may include steps such as analog-to-digital conversion, data compression, and the like. One of ordinary skill in the art will recognize that the preprocessing may depend on the medium through which the authentication data is transmitted from the user. For example, if an audio clip is transmitted over a computer network such as the Internet, the clip will already be in the digital domain and thus would not require analog-to-digital conversion. In the case of image or video-based authentication data, registration preprocessing blocks 624, 642 may include steps such as noise reduction, data compression, and the like. In some embodiments, the preprocessing performed by registration preprocessing blocks 606, 622, 640 may be omitted.

The preprocessed authentication data is then analyzed in an appropriate registration analysis block 608, 628, 644. Registration analysis blocks 608, 626, 644 may include steps for feature extraction, feature transformation, and the like. Registration analysis blocks 608, 626, 644 may also be configured to store the analyzed authentication data in a storage area, such as registration database, for later retrieval at a time of verification.

At verification blocks 610, 628, 646, input authentication data is received and compared to the authentication data registered in registration blocks 604, 622, 640. Each verification block includes a verification preprocessing block 612, 630, 648 that is similar in function to registration preprocessing blocks 606, 624, 642. In some embodiments, the preprocessing performed by verification preprocessing block 612, 630, 648 may be omitted. Once the input authentication data is preprocessed, it is analyzed against registered authentication data in an appropriate verification analysis block 614, 632, 650. In various embodiments, the steps performed in verification analysis block 614, 632, 650 depend on the steps performed in the corresponding registration analysis block 608, 626, 644. For example, if acoustic registration analysis block 608 simply involves extracting time samples, acoustic verification analysis block 614 will compare the register time samples with time samples provided from acoustic verification preprocessing block 612. Other types of algorithms for verification/analysis of acoustic, image, and video-based data are well-known and are contemplated to be within the scope of the present invention.

Verification analysis block 614, 632, 650 outputs a measure that is passed to decision block 616, 634, 652. If the measure indicates that the input authentication data matches the registered authentication data, the identity of the user is verified (618, 636, 654). On the other hand, if the measure indicates that the input authentication data does not match the registered authentication data, the verification attempt fails (620, 638, 656). The determination of whether a match has occurred may be based on any of a number of user-defined criteria.

Figure 7:
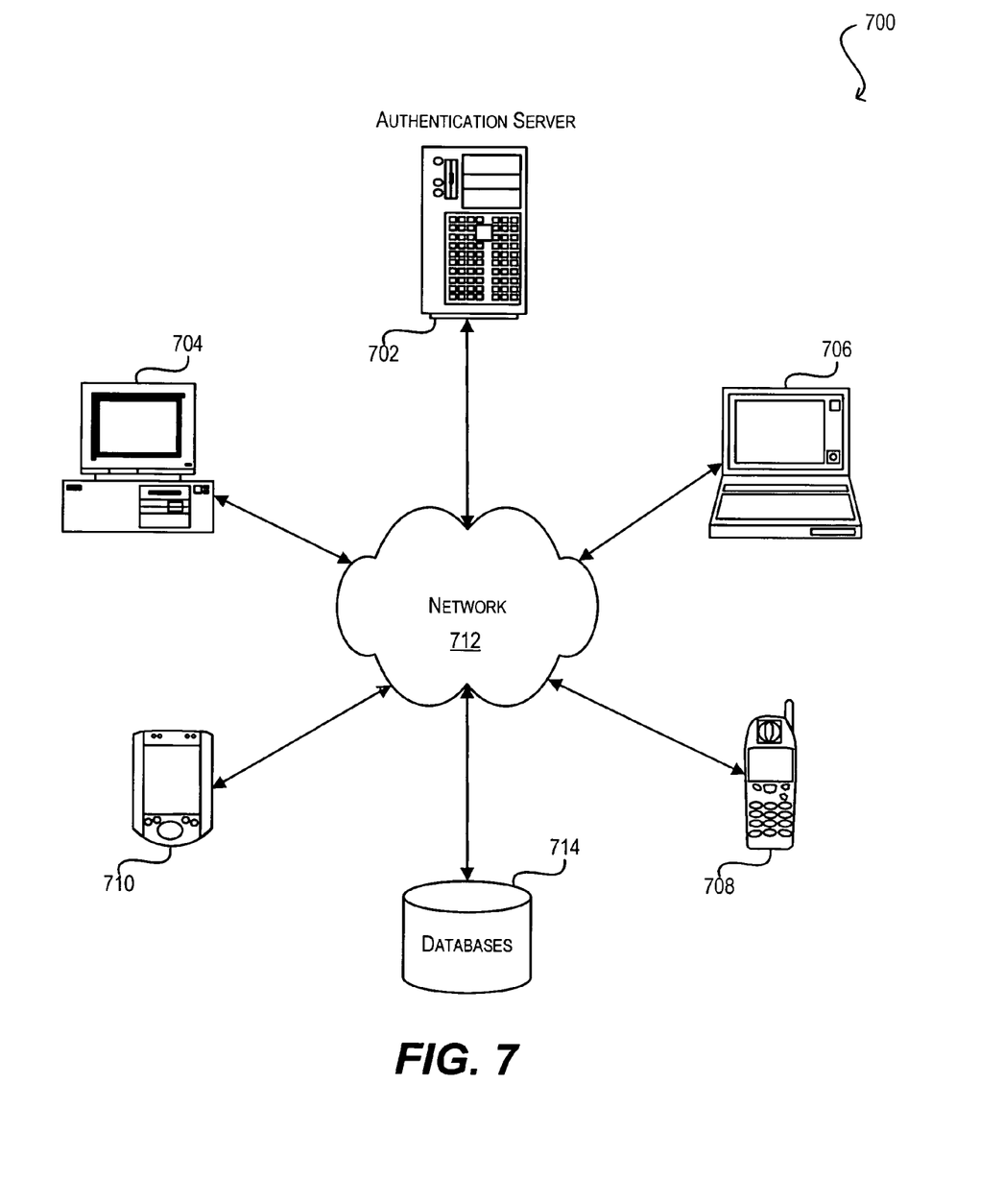
FIG. 7 is a simplified block diagram of a system environment that may be used in accordance with an embodiment of the present invention.

FIG. 7 is a simplified block diagram illustrating components of an exemplary system environment 700 that may incorporate an embodiment of the present invention. As shown, system environment 700 includes one or more user devices 704, 706, 708, 710. In various embodiments, user devices 704, 706, 708, 710 are configured to store personalized authentication data as described throughout this disclosure. Further, client devices 704, 706, 708, 710 may be configured to provide said personalized authentication data to an authentication service or system at a time of authentication.

In one set of embodiments, user devices 704, 706, 708, 710 may be general purpose personal computers (including, merely by way of example, personal computers and/or laptop computers running various versions of Microsoft Windows and/or Apple Macintosh operating systems), cellular phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, user devices 704, 706, 708, 710 may be any other device, such as a smart card, security token, flash memory card, etc. that is capable of storing data in a nonvolatile memory. Although exemplary system environment 700 is shown with four user devices, any number of user devices may be supported.

In some embodiments, system environment 700 includes a network 712. Network 712 may be any type of network familiar to those skilled in the art that can support data communications using any of a variety of commercially-available protocols, including without limitation TCP/IP, SNA, IPX, AppleTalk, and the like. Merely by way of example, network 712 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); a cellular telephony network; an infra-red network; a wireless network (e.g., a network operating under any of the IEEE 802.11 suite of protocols, the Bluetooth protocol known in the art, and/or any other wireless protocol); and/or any combination of these and/or other networks.

System environment 700 also includes one or more server computers 702 which may be general purpose computers, specialized server computers (including, merely by way of example, PC servers, UNIX servers, mid-range servers, mainframe computers rack-mounted servers, etc.), server farms, server clusters, or any other appropriate arrangement and/or combination. In various embodiments, server 702 may be adapted to run one or more services or software applications described in the foregoing disclosure. For example, server 702 may act as an authentication server that is configured to received authentication data from user devices 704, 706, 708, 710 via network 712 and authenticate users of said devices based on the received authentication data.

Server 702 may run an operating system including any of those discussed above, as well as any commercially available server operating system. Server 702 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 700 may also include one or more databases 714. For instance, databases 714 may include a registration database configured to store associations between personalized authentication data and identities of users. Databases 714 may reside in a variety of locations. By way of example, one or more of databases 714 may reside on a storage medium local to (and/or resident in) one or more of the computers/devices 702, 704, 706, 708, 710. Alternatively, databases 714 may be remote from any or all of the computers/devices 702, 704, 706, 708, 710, and/or in communication (e.g., via network 712) with one or more of these. In one set of embodiments, databases 714 may reside in a storage-area network (SAN) familiar to those skilled in the art. Similarly, any necessary files for performing the functions attributed to the computers/devices 702, 704, 706, 708, 710 may be stored locally on the respective device and/or remotely, as appropriate. In one set of embodiments, databases 714 may include relational databases, such as Oracle 10g, that are adapted to store, update, and retrieve data in response to SQL-formatted commands.

According to one embodiment of the present invention, a user may register personalized authentication data by transmitting the personalized authentication data to authentication server 702 via network 712. For example, the personalized authentication data may be stored on a device of the user (e.g., one or more of user devices 704, 706, 708, 710), and transmitted to server 702 by being retrieved from the device and uploaded or played back via network 712. In various embodiments, authentication server 702 is configured to perform the processing of registration blocks 604, 622, 640 of FIG. 6, and thereby register the personalized authentication data with an identity of the user. In one embodiment, the personalized authentication data may be stored in a data storage area accessible to server 702, such as a registration database 714.

Once the personalized authentication data has been registered, the user may be authenticated by transmitting input authentication data to authentication server 702 via network 712. In various embodiments, the input authentication data corresponds to the personalized authentication data previously registered by the user. As in the case of registration, the input authentication data may be stored on a user device 704, 706, 708, 710 and transmitted to authentication server 702 by being retrieved from the device and uploaded or played back via network 712. In various embodiments, authentication server 702 is configured to perform the processing of verification blocks 610, 628, 646 and decision blocks 616, 634, 652 of FIG. 6, and thereby verify an identity of the user.

Figure 8:
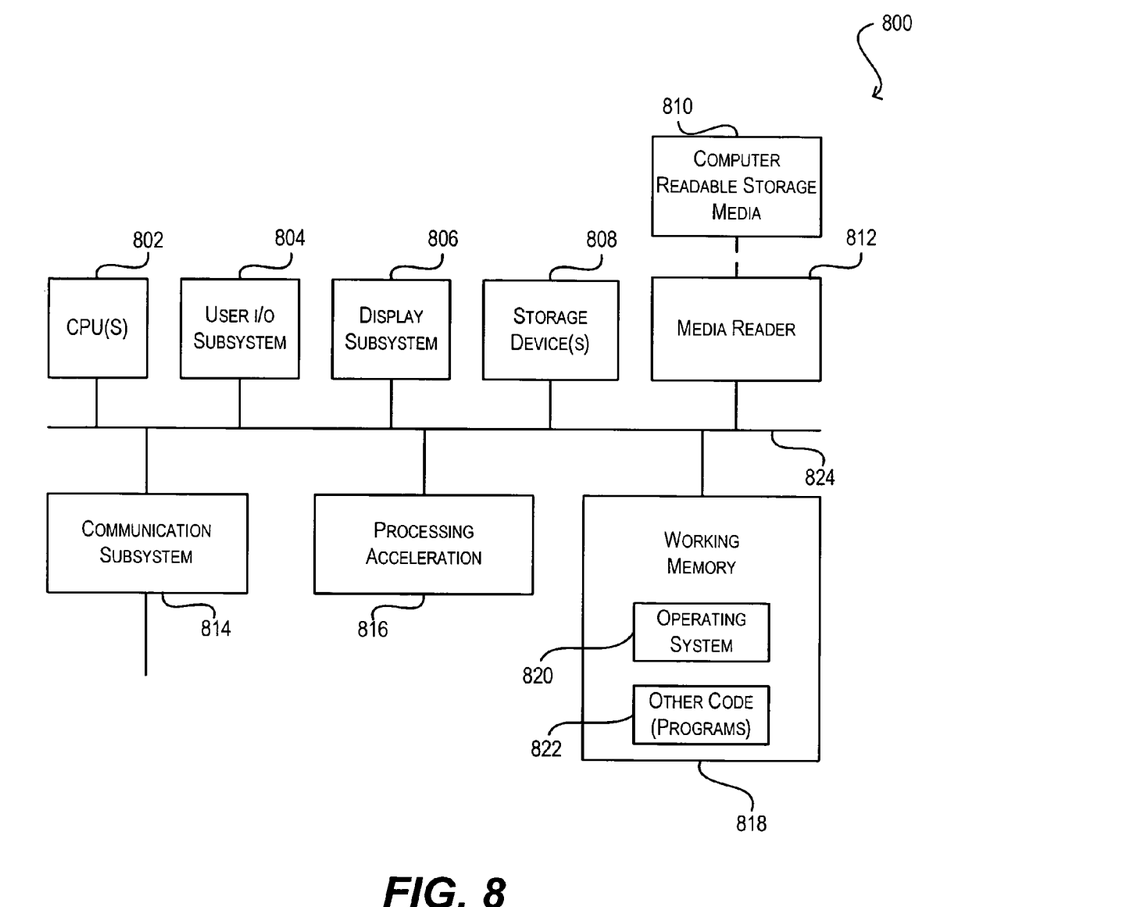
FIG. 8 is a simplified block diagram of a client device that may be used in accordance with an embodiment of the present invention.

FIG. 8 illustrates an exemplary computer system 800 that may be used in accordance with embodiments of the present invention. In various embodiments, system 800 may be used to implement any of the computers/devices 702, 704, 706, 708, 710 described above. Computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). Computer system 800 may also include one or more storage devices 808. By way of example, the storage device(s) 808 may include devices such as disk drives, optical storage devices, and solid-state storage devices such as a random access memory (RAM) and/or a read-only memory (ROM), which can be programmable, flash-updateable and/or the like.

Computer system 800 may additionally include a computer-readable storage media reader 812, a communications subsystem 814 (e.g., a modem, a network card (wireless or wired), an infra-red communication device, etc.), and working memory 818, which may include RAM and ROM devices as described above. In some embodiments, computer system 800 may also include a processing acceleration unit 816, which can include a digital signal processor (DSP), a special-purpose processor, and/or the like.

Computer-readable storage media reader 812 can further be connected to a computer-readable storage medium 810, together (and, optionally, in combination with storage device (s) 808) comprehensively representing remote, local, fixed, and/or removable storage devices plus storage media for temporarily and/or more permanently containing computer-readable information. Communications system 814 may permit data to be exchanged with network 712 and/or any other device described above with respect to system environment 700.

Computer system 800 may also comprise software elements, shown as being currently located within working memory 818, including an operating system 820 and/or other code 822, such as an application program (which may be a client application, Web browser, mid-tier application, RDBMS, etc.). It should be appreciated that alternative embodiments of computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method performed by an authentication device having a hardware processor and a memory storing information associating first non-textual authentication data with an identity of a user, wherein the first non-textual authentication data is exclusive of biometric data identifying biometric characteristics inherent to the user, the method comprising:
   receiving, by the authentication device, input authentication data from a client device of the user in response to a user authentication process by the authentication device that determines identity of the user of the client device;
   comparing, by the authentication device, the input authentication data provided by the client device with the first non-textual authentication data stored in the memory; and
   authenticating, by the authentication device, the user of the client device during the user authentication process based on the input authentication data matching the first non-textual authentication data.

2. The method of claim 1, wherein the first non-textual authentication data includes acoustic data.

3. The method of claim 2, wherein the acoustic data corresponds to a user-provided tone sequence or a user-provided audio clip.

4. The method of claim 1, wherein the first non-textual authentication data includes graphical data.

5. The method of claim 4, wherein the graphical data corresponds to a user-provided still image or a user-provided video clip.

6. The method of claim 1 further comprising:
   storing the first non-textual authentication data in the memory during a user registration process by the authentication device with the user; and
   retrieving the first non-textual authentication data from the memory at a time of authentication.

7. The method of claim 1, wherein authenticating the user is further based on one or more attributes of the client device.

8. The method of claim 1, wherein the client device is selected from a group consisting of a personal computer, a personal digital assistant (PDA), a smart card, a security token, and a mobile telephone.

9. The method of claim 1 further comprising:
   receiving information associating second non-textual authentication data with the identity of the user, wherein the second non-textual authentication data is different from the first non-textual authentication data and is exclusive of biometric data identifying biometric characteristics inherent to the user; and enabling selection of either the first non-textual authentication data or the second non-textual authentication data for use in authenticating the user.

10. The method of claim 1, further comprising:

receiving the first non-textual authentication data from the user during a registration process by the authentication device; and registering the first non-textual authentication data with the identity of the user in a registration database.

11. The method of claim 10, wherein the first non-textual authentication data is received via a computer network.

12. The method of claim 11, wherein the computer network is the Internet.

13. The method of claim 10, wherein the first non-textual authentication data is received via a voice-based network.

14. The method of claim 1, wherein authenticating the user during the user authentication process based on the input authentication data matching the first non-textual authentication data comprises:

determining whether at least a portion of the input authentication data matches the first non-textual authentication data.

15. A system comprising:

a processor; and a memory operatively coupled to the processor, the memory storing information associating first non-textual authentication data with an identity of a user, wherein the first non-textual authentication data is exclusive of biometric data identifying biometric characteristics inherent to the user, the memory further storing program instructions that, when executed by the processor, cause the processor to:

receive input authentication data from a client device of the user in response to a user authentication process by the processor that determines identity of the user of the client device;

compare the input authentication data provided by the client device with the first non-textual authentication data stored in the memory; and authenticate the user of the client device during the user authentication process based on the input authentication data matching the first non-textual authentication data.

16. A non-transitory machine-readable medium having stored thereon a series of instructions which, when executed by a hardware processing component of an authentication device, cause the processing component to facilitate user authentication by:

receiving information associating non-textual authentication data with an identity of a user, wherein the non-textual authentication data is exclusive of biometric data identifying biometric characteristics inherent to the user;

receiving input authentication data from a client device of the user in response to a user authentication process by the authentication device that determines identity of the user of the client device;

comparing the input authentication data provided by the client device with the first non-textual authentication data; and authenticating the user of the client device during the user authentication process based on the input authentication data matching the non-textual authentication data.

17. The method of claim 1 wherein the first non-textual authentication data does not include a representation of the user's appearance or the user's voice.

18. The system of claim 15 wherein the non-textual authentication data does not include a representation of the user's appearance or the user's voice.

19. The non-transitory machine-readable medium of claim 16 wherein the non-textual authentication data does not include a representation of the user's appearance or the user's voice.

* * * * *